(12) United States Patent
Miura

(10) Patent No.: US 7,995,328 B2
(45) Date of Patent: Aug. 9, 2011

(54) CAPACITOR

(75) Inventor: Teruhisa Miura, Kyoto (JP)

(73) Assignee: Panasonic Corporation, Osaka (JP)

( * ) Notice: Subject to any disclaimer, the term of this patent is extended or adjusted under 35 U.S.C. 154(b) by 314 days.

(21) Appl. No.: 12/514,367

(22) PCT Filed: Dec. 5, 2007

(86) PCT No.: PCT/JP2007/073460
§ 371 (c)(1),
(2), (4) Date: May 11, 2009

(87) PCT Pub. No.: WO2008/072511
PCT Pub. Date: Jun. 19, 2008

(65) Prior Publication Data
US 2010/0046144 A1 Feb. 25, 2010

(30) Foreign Application Priority Data
Dec. 7, 2006 (JP) .................................. 2006-330199

(51) Int. Cl.
*H01G 9/00* (2006.01)

(52) U.S. Cl. ........ 361/502; 361/504; 361/512; 361/523; 361/525; 361/528

(58) Field of Classification Search ................ 361/502, 361/503–504, 509, 512, 516–519, 523, 525, 361/528–529, 540–541; 29/25.01, 25.03
See application file for complete search history.

(56) References Cited

U.S. PATENT DOCUMENTS

| 6,051,038 | A | * | 4/2000 | Howard et al. | ............... 29/623.1 |
|---|---|---|---|---|---|
| 6,246,569 | B1 | * | 6/2001 | Strange et al. | ................ 361/508 |
| 6,466,430 | B2 | * | 10/2002 | Mido et al. | .................... 361/529 |
| 7,247,178 | B2 | * | 7/2007 | Hirano et al. | ................ 29/25.03 |
| 7,457,102 | B2 | | 11/2008 | Miura et al. | |
| 2004/0246657 | A1 | * | 12/2004 | Norton | .......................... 361/503 |

FOREIGN PATENT DOCUMENTS

| JP | 10-275751 A | 10/1998 |
|---|---|---|
| JP | 2005-294344 A | 10/2005 |
| JP | 2006-173440 A | 6/2006 |

OTHER PUBLICATIONS

International Search Report for PCT/JP2007/073460.

* cited by examiner

*Primary Examiner* — Nguyen T Ha
(74) *Attorney, Agent, or Firm* — Pearne & Gordon LLP

(57) ABSTRACT

A capacitor for use in a hybrid vehicle and the like has a structure contrived to achieve reduction in size, increase in capacitance and decrease in resistance. An element has a pair of positive and negative electrodes, each comprising a collector made of a metallic foil having a carbon-containing electrode layer formed thereon, the electrodes rolled up with a separator interposed therebetween to form a pair of electrode terminations at opposite sides of the element. A dimension of one of the electrode terminations is set shorter than that of the other electrode termination. This structure achieves an increase in capacitance and decrease in resistance since it can increase an effective area of electrode surfaces under a restricted condition of keeping the same height of the element as it is placed inside a casing of given dimensions.

6 Claims, 5 Drawing Sheets

CAPACITOR

This application is a U.S. national phase application of PCT international application PCT/JP2007/073460.

TECHNICAL FIELD

The present invention relates to capacitors used for regeneration of power in a variety of electronic apparatuses, hybrid vehicles and the like and storage of power.

BACKGROUND ART

FIG. 4 is a sectional view showing a structure of an electric double layer capacitor representing one example of conventional capacitor of this type. FIG. 5 is a sectional view of an element used for the electric double layer capacitor. In FIGS. 4 and 5, reference mark 11 denotes the element, and reference mark 11a denotes a void space formed in element 11. Element 11 is so constructed that a pair of positive and negative electrodes, each comprising a collector made of a metallic foil such as an aluminum foil having a polarized electrode layer formed thereon except for one side of the edges, are arranged in orientations opposite to each other, and they are rolled up (not shown) with a separator interposed between them in such a configuration that bare portions where the polarized electrode layers are not formed along the side edges of the positive and negative electrodes protrude from the opposite sides with respect to each other. The positive and negative electrodes are thus tapped out individually from the respective sides (at the top and the bottom in FIG. 4) of element 11.

Positive electrode termination 11b and negative electrode termination 11c formed of the bare portions not having the polarized electrode layers at both sides of element 11 have same protruding lengths as indicated by H3.

Reference mark 12 denotes a cylindrically shaped metal casing having a bottom and being made of aluminum containing aforesaid element 11 together with an active electrolyte (not shown). Negative electrode termination 11c of element 11 inserted in metal casing 12 is bonded both mechanically and electrically to an inner bottom surface of metal casing 12 by such means as laser welding.

Reference mark 13 denotes a terminal plate made of aluminum disposed to and seal an opening of metal casing 12 while having its inner surface bonded to positive electrode termination 11b of element 11 by laser welding or the like means. Reference mark 14 denotes a seal rubber of electrical insulation property disposed around a peripheral edge on an upper surface of terminal plate 13, and rubber 14 seals metal casing 12 when the top opening is crimped so as to press rubber 14.

The conventional electric double layer capacitor constructed as above has a structure in which positive electrode termination 11b and negative electrode termination 11c formed on the both sides of element 11 are bonded to terminal plate 13 and the inner bottom surface of metal casing 12 respectively. Accordingly, the capacitance thereof are increased by improving an efficiency of using a capacity available for containing the element while also achieving a low resistance by virtue of the structure.

Patent document 1 is one example of the prior art documents known to be relevant to the invention of this application.

Conventional electric double layer capacitors of the above type have a problem, however, that they are still far from satisfying the accelerating demand of further reduction in size although they have attained a substantial reduction as compared with the ordinary type of capacitors.

One of the reasons is that both positive electrode termination 11b and negative electrode termination 11c are fabricated to have the same protruding lengths of H3. If they are not of the same length, one side of the element having a smaller length of the bare portion not provided with a carbon electrode layer is not likely to become buckled, or deformed due to a larger bearing strength (i.e., rigidity or reactive force) whereas the other side of the element having a larger length of the bare portion becomes buckled or deformed easily when the element is sandwiched from both sides between the inner bottom surface of the metal casing and the bottom face of the terminal plate. When there is a difference in degree of buckling between the two sides of the element, the one side of the bare portion exhibiting a larger degree of buckling tends to exert local stresses on the separator. This causes a reduction in distance between the electrodes at areas where the stresses are exerted, and decreases resistances at these areas due to the short distance, which leads to concentration of electric current around these areas when energized, thereby giving rise to another problem of increasing a possibility of becoming a condition near to short-circuiting. The positive and negative electrode have therefore been fabricated to the same dimensions in the past to avoid the above problem. It is also for the same reason that the buckled lengths have been set equal as shown by F3 in FIG. 4.

Patent Document 1: Japanese Patent Unexamined Publication, No. 2006-173440

SUMMARY OF THE INVENTION

The present invention is intended to solve the above problems of the conventional art, and to provide a capacitor contrived to achieve further reduction in size, increase in capacitance and decrease in resistance.

The present invention covers the capacitor constructed of an element having a pair of positive and negative electrodes, each comprising a collector made of a metallic foil having a carbon-containing electrode layer formed thereon except for one side of the edges, the electrodes arranged in orientations opposite to each other and rolled up with a separator interposed therebetween in a configuration that bare portions where the carbon-containing electrode layers are not formed along the side edges of the positive and negative electrodes protrude from the edges of the separator at the opposite sides with respect to each other to form a pair of electrode terminations. The capacitor also comprises a cylindrically shaped metal casing housing the element together with an active electrolyte, and having a bottom, an inner bottom surface bonded to one of the electrode terminations of the element, and a terminal plate having an inner surface bonded to the other electrode termination of the element and sealing an opening of the metal casing. The bare portion not provided with the carbon-containing electrode layer at the one side of the element bonded to the inner bottom surface of the metal casing is set shorter in protruding length than the other bare portion at the opposite side of the element bonded to the inner surface of the terminal plate.

In the capacitor according to the present invention, it is possible to make the element smaller in height by an extent of reduction made on the protruding length of the bare portion at the side of the element bonded to the inner bottom surface of the metal casing as compared to that of the other side of the element bonded to the inner surface of the terminal plate. In other words, the invention provides an advantageous effect of increasing the capacitance and decreasing the resistance at the same time since it can increase an effective area of electrode surfaces while maintaining a height of the element unchanged.

DETAILED DESCRIPTION OF PREFERRED EMBODIMENT

Figure 1:
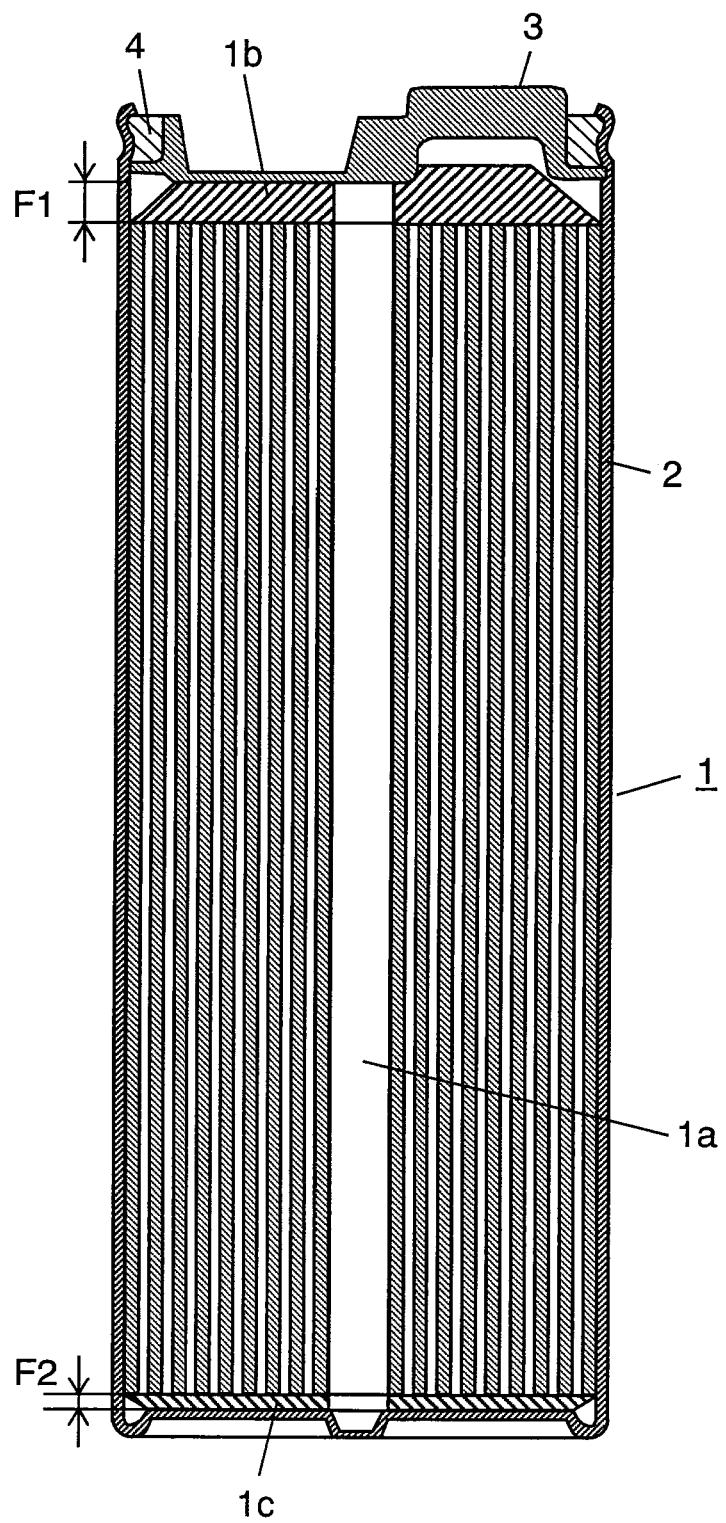
FIG. 1 is a sectional view of a capacitor according to an exemplary embodiment of the present invention.
Figure 2:
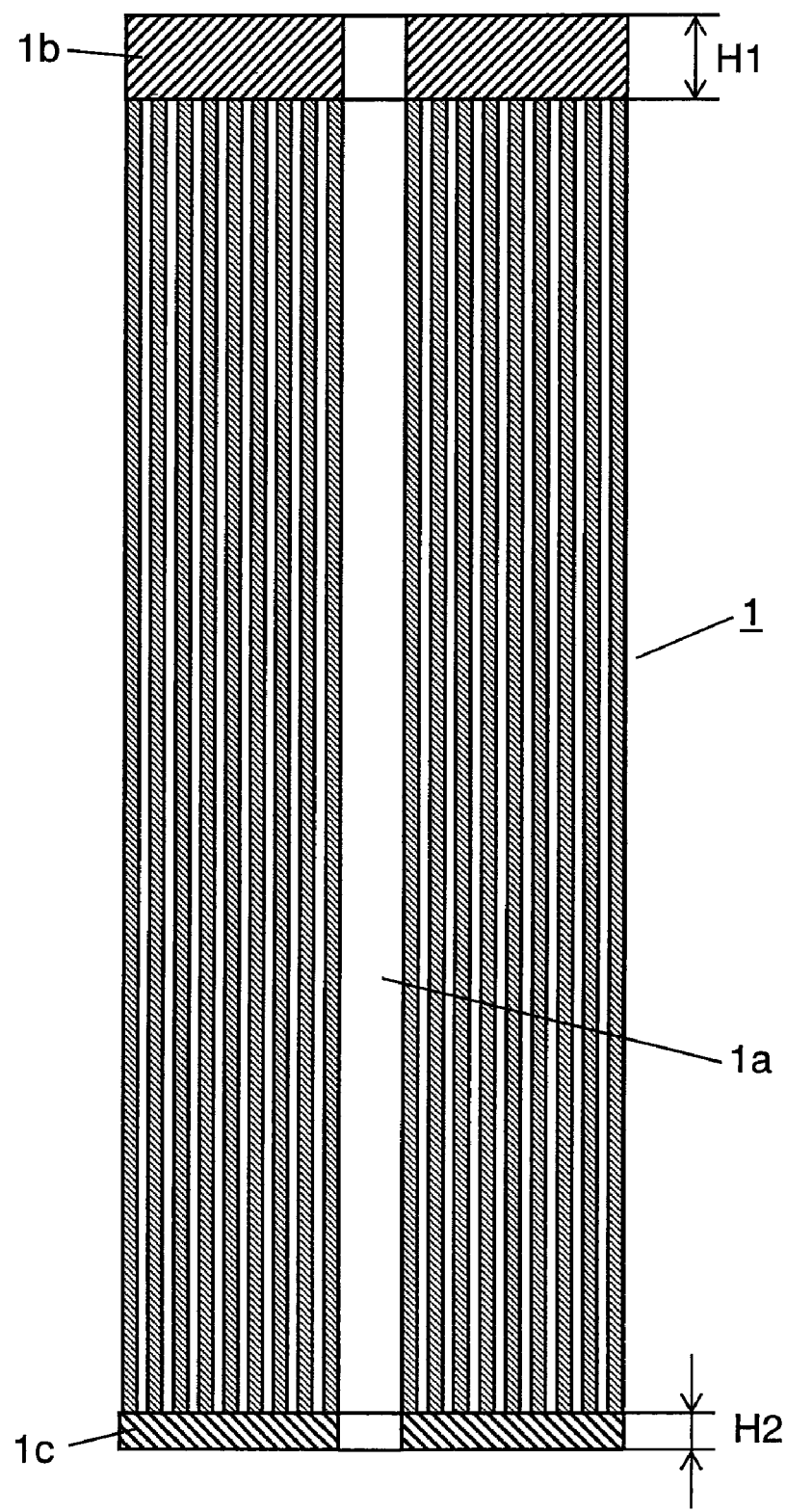
FIG. 2 is a sectional view of an element used for the capacitor according to the exemplary embodiment of the present invention.
Figure 3:
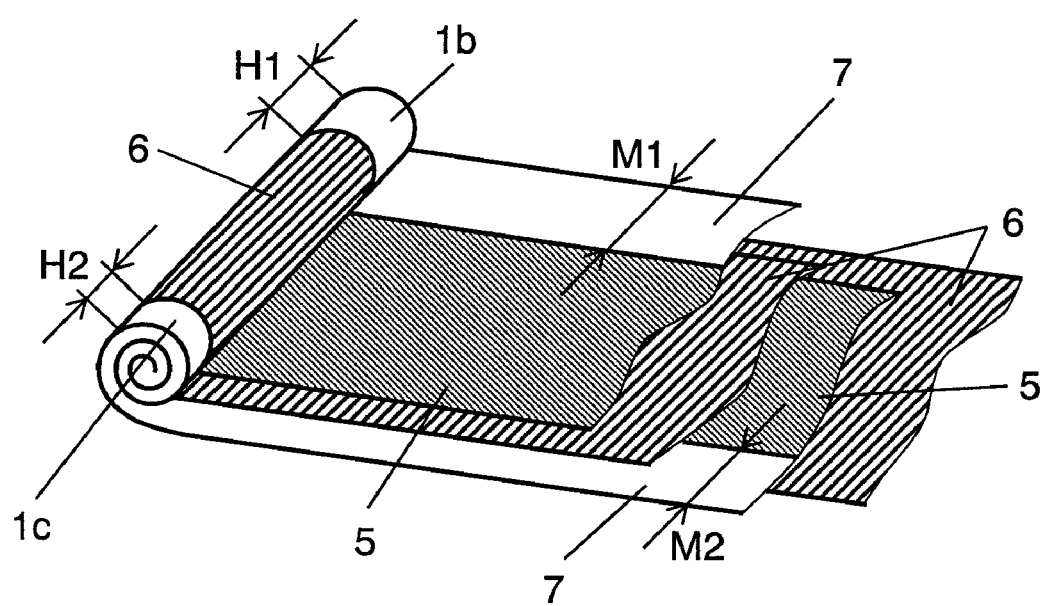
FIG. 3 is an exploded view of the element used for the capacitor according to the exemplary embodiment of the present invention.

Description is provided hereinafter of the present invention by referring to a concrete exemplary embodiment. FIG. 1 is a sectional view showing a structure of an electric double layer capacitor according to an exemplary embodiment of the present invention, and FIG. 2 is a sectional view showing an element used for the electric double layer capacitor. The element used for the electric double layer capacitor of this invention is produced by rolling up a plurality of sheets, of which an exploded view is shown in FIG. 3. In FIGS. 1, 2 and 3, element 1 has void space 1a formed therein, and element 1 is so constructed that a pair of positive and negative electrodes, each comprising a collector made of an aluminum foil having a carbon-containing electrode layer formed thereon except for one side of the edges (i.e., a portion marked 7 in FIG. 3), are placed in opposite orientations with respect to each other and they are rolled up with separator 6 interposed between them. Furthermore, the positive and negative electrodes are so arranged that parts of bare portions 7 not provided with the carbon-containing electrode layers and not overlapped with separators 6 protrude from the two sides opposite to each other, so that the positive and negative electrodes are drawn out of the both sides (at the top and the bottom in FIG. 1) of element 1, individually.

In addition, individual electrode terminations 1b and 1c formed of bare portions 7 not having carbon-containing electrode layer at both sides of element 1 have different lengths of protrusion from the edges of separators 6, such that length H2 of electrode termination 1c protruding from one side edges of separators 6 is shorter than length H1 of electrode termination 1b protruding from the other side edges of separators 6. Here, the length of protrusion is defined as a dimension of bare portion 7 not provided with the carbon-containing electrode layer and not overlapped with separators 6.

In order to achieve this difference in the lengths of protrusion from the edges of the separators, the bare portions are so formed as to have different dimensions M1 and M2, as shown in FIG. 3, by not providing the carbon-containing electrode layers prior to the process of rolling up to complete element 1. This helps minimize a loss in the effective area of electrode surfaces. In the conventional capacitors, dimensions M1 and M2 have generally been equal since they have been made symmetrical on both sides.

Element 1 is inserted together with an active electrolyte into cylindrically shaped closed-bottom metal casing 2 made of aluminum, and one side of electrode termination 1c of element 1 is mechanically and electrically bonded to an inner bottom surface of metal casing 2 by laser welding or the like.

Terminal plate 3 made of aluminum is disposed to and seal an opening of metal casing 2 while having its inner surface bonded to positive electrode termination 1b of element 1 by laser welding or the like. Seal rubber 4 having an electrical insulation property is disposed around a peripheral edge on an upper surface of terminal plate 3. Seal rubber 4 seals metal casing 2 when the top opening is crimped so as to press seal rubber 4. The electric double layer capacitor of this exemplary embodiment is thus completed.

Figure 4:
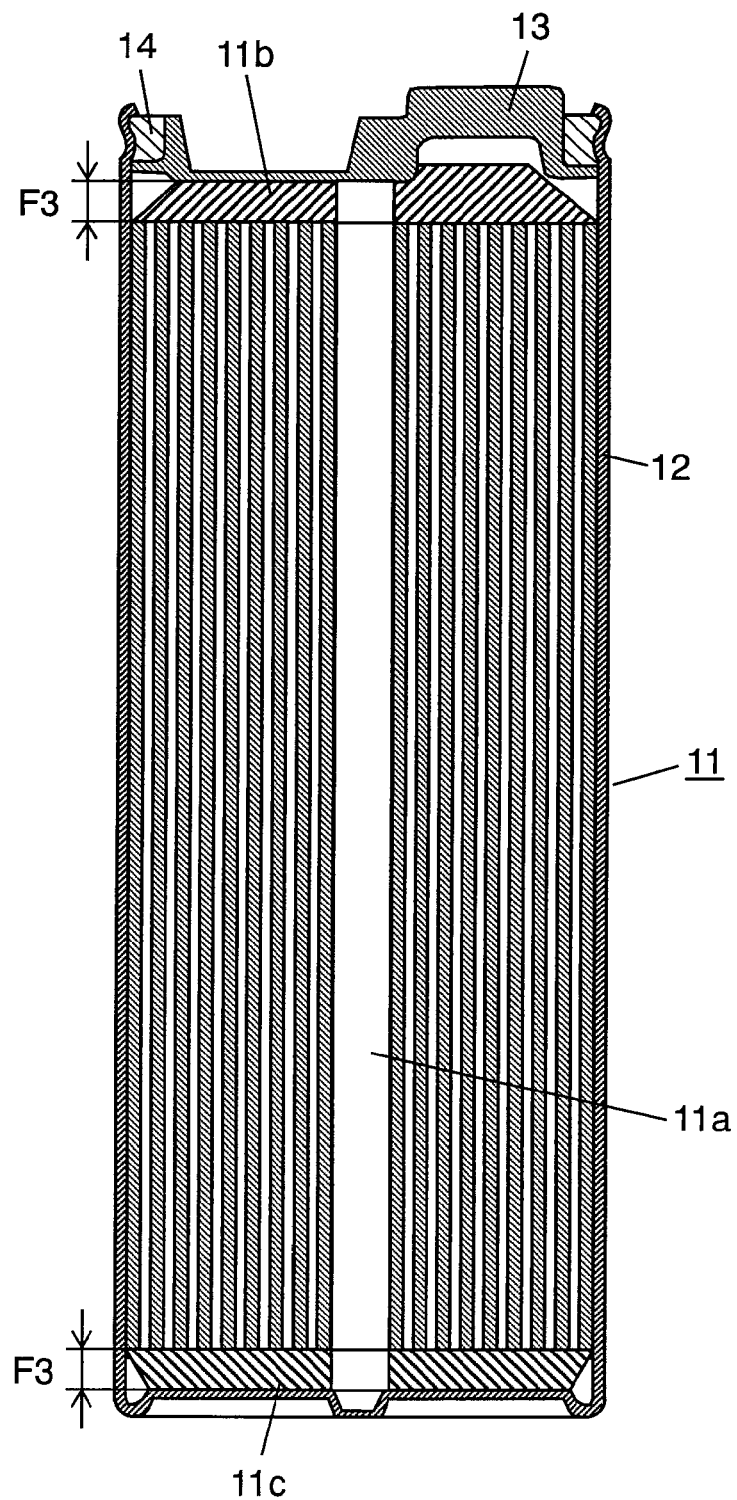
FIG. 4 is a sectional view showing a structure of an electric double layer capacitor representing one example of conventional capacitors.
Figure 5:
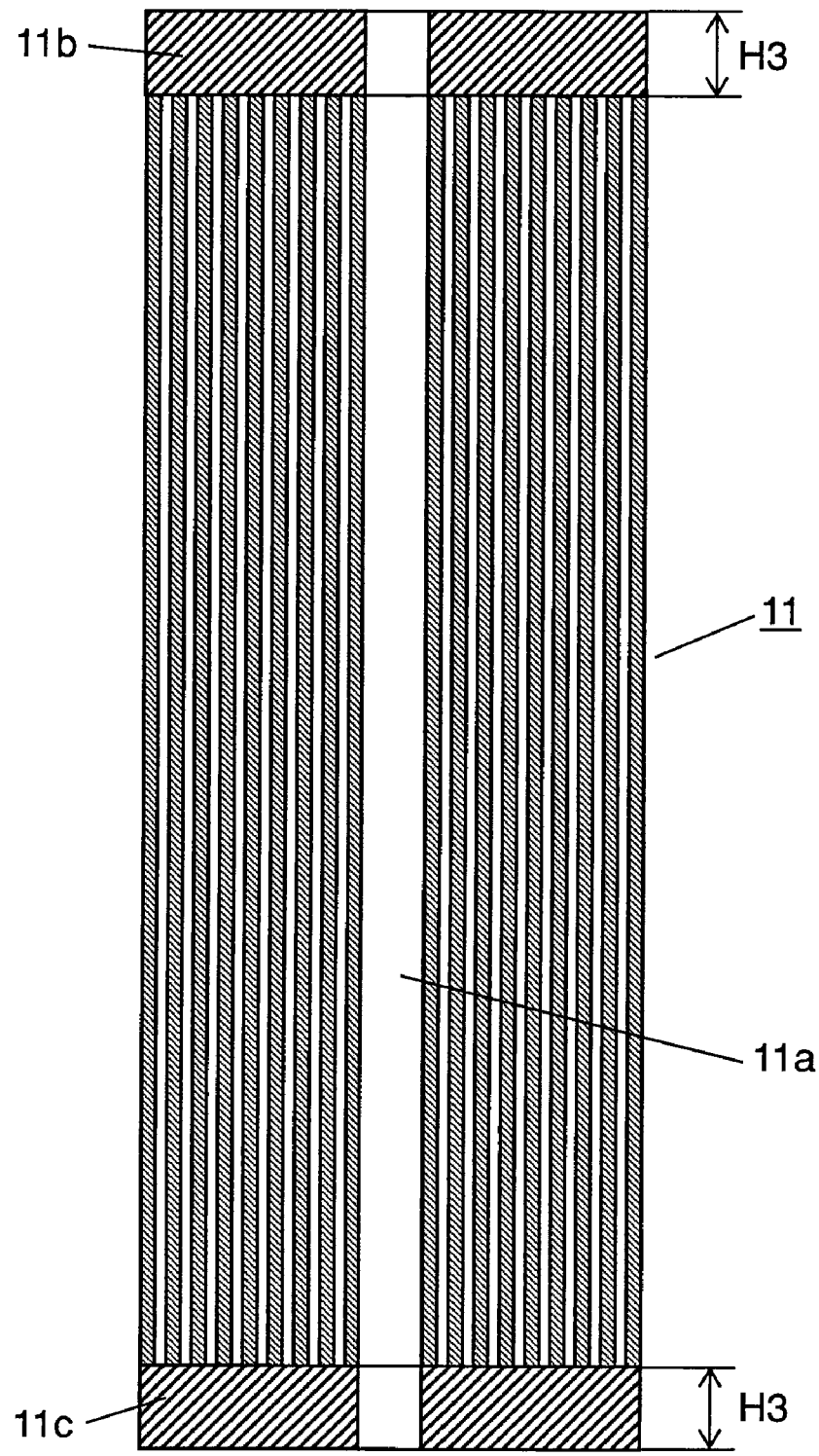
FIG. 5 is a sectional view showing an element used for the electric double layer capacitor.

Terminal plate 3 is provided with a flange in the periphery of a weld area for the purpose of confining a diameter of the weld area. An outer diameter of electrode termination 1b is reduced beforehand because electrode termination 1b needs to be in contact with the weld area prior to the welding process. This is accomplished by partially bending electrode termination 1b toward the center (i.e., inner direction). It is necessary that dimensions of the bent portions F1 and F2 are the bare portions not provided with the carbon electrode layers and protruding from the separators of the element, and that they shall not be covered with the separators. When the electrode terminations are bent in this fashion, the outer perimeters at the side ends of the element must be reduced to the required diameters, which are thus regarded as determining factors of the bear portions. In this exemplary embodiment, the dimension of bent portion F2 is set smaller than that of bent portion F1. In the case of conventional capacitors, dimensions of the bent portions have been arranged equal at both sides, as shown by F3 in FIG. 4, to avoid unbalanced buckling.

Since the weld bonding technique employed for the terminations of the element uses laser irradiation applied from the outer bottom side of the casing and the outer surface of the terminal plate, the heat generated by the laser irradiation will cause the carbon-containing electrode layers to burn and create holes in areas of the casing and the terminal plate where the laser is irradiated if the element is not provided with the bare portions. A certain length of the bare portions is therefore necessary in the structure.

The electric double layer capacitor constructed as above according to this exemplary embodiment has the structure that protruding length H2 of electrode termination 1c bonded to the inner bottom surface of metal casing 2 is made shorter than protruding length H1 of electrode termination 1b extending from the edges of the separators, which makes it possible to increase an effective surface area of electrode 1 by an extent of this reduction in the protruding length when a height of element 1 is kept unchanged, and this can thereby provide an outstanding advantage of increasing the capacitance and decreasing the resistance at the same time.

Table 1 shows a result of comparison of capacitances and resistances between a conventional capacitor having protruding lengths of 7.0 mm from the edges of separators at both sides of electrode terminations and one example of the invented capacitor having a protruding length of one of electrode terminations reduced to 2.5 mm from the one side edges of separators. For the samples of this comparison, capacitor elements of 50 mm in diameter by 70 mm in height are used.

TABLE 1

|  | Invented sample | Conventional sample |
| --- | --- | --- |
| Capacitance | 1065 F | 985 F |
| DC Resistance | 1.01 mΩ | 1.10 mΩ |

As apparent from Table 1, the electric double layer capacitor of this exemplary embodiment can achieve a reduction in size, increase in capacitance and decrease in resistance as it exhibits an increase of 8% in capacitance and a decrease of 8% in resistance as compared to the conventional capacitor.

What has been described above is an example in which the protruding lengths of the bare portions not provided with the carbon-containing electrode layers as measured from the edges of the separators are formed different between one side of the element bonded to the inner bottom surface of the metal casing and the other side bonded to the inner surface of the terminal plate. However, similar advantageous effect is also achievable with a capacitor so constructed that lengths of bare portions themselves are formed differently between one side of its element bonded to an inner bottom surface of a metal casing and the other side bonded to an inner surface of a terminal plate.

Similar advantageous effect is similarly achievable with a capacitor so constructed that dimensions of bent portions within bare portions are set differently between one side of its element bonded to an inner bottom surface of a metal casing and the other side bonded to an inner surface of a terminal plate.

Although what has been described in this exemplary embodiment is only the example in which the protruding length of the bare portion not provided with the carbon-containing electrode layer at the side bonded to the inner bottom surface of the metal casing is set shorter than the protruding length of the bare portion at the other side bonded to the inner surface of the terminal plate, similar advantageous effect is also achievable even if the protruding length of the bare portion at the side bonded to the inner bottom surface of the metal casing is set longer than that of the bare portion at the other side bonded to the inner surface of the terminal plate when other collateral conditions are met.

INDUSTRIAL APPLICABILITY

The capacitor of this invention has an advantage of achieving reduction in size, increase in capacitance and decrease in resistance at the same time, so that it is especially useful for such application as regeneration of power in a hybrid vehicle.

The invention claimed is:

1. A capacitor comprising:
   an element having a pair of positive and negative electrodes, each comprising a collector made of a metallic foil having a carbon-containing electrode layer formed thereon except for one side of edges, the electrodes arranged in orientations opposite to each other and rolled up with a separator interposed therebetween in a configuration that bare portions where the carbon-containing electrode layer is not formed along the edges of the positive and negative electrodes protrude from edges of the separator at the opposite sides with respect to each other and form a pair of electrode terminations;
   a cylindrically shaped closed-bottom metal casing containing the element together with an active electrolyte, the metal casing having an inner bottom surface bonded to one of the electrode terminations of the element; and
   a terminal plate having an inner surface bonded to the other electrode termination of the element and sealing an opening of the metal casing,
   wherein length of the bare portion not provided with the carbon-containing electrode layer on one side of the element bonded to the inner bottom surface of the metal casing is set different from length of the bare portion not provided with the carbon-containing electrode layer on the other side bonded to the inner surface of the terminal plate.

2. The capacitor according to claim 1, wherein the length of the bare portion at the side of the element bonded to the inner bottom surface of the metal casing is set shorter than the length of the bare portion at the other side bonded to the inner surface of the terminal plate.

3. The capacitor according to claim 1, wherein the element comprises an electric double layer capacitor.

4. A capacitor comprising:
   an element having a pair of positive and negative electrodes, each comprising a collector made of a metallic foil having a carbon-containing electrode layer formed thereon except for one side of edges, the electrodes arranged in orientations opposite to each other and rolled up with a separator interposed therebetween in a configuration that bare portions where the carbon-containing electrode layer is not formed along the edges of the positive and negative electrodes protrude from edges of the separator at the opposite sides with respect to each other and form a pair of electrode terminations;
   a cylindrically shaped closed-bottom metal casing containing the element together with an active electrolyte, the metal casing having an inner bottom surface bonded to one of the electrode terminations of the element; and
   a terminal plate having an inner surface bonded to the other electrode termination of the element and sealing an opening of the metal casing,
   wherein length of the bent portion in the bare portion not provided with the carbon-containing electrode layer on one side of the element bonded to the inner bottom surface of the metal casing is set different from length of the bent portion in the bare portion not provided with the carbon-containing electrode layer on the other side bonded to the inner surface of the terminal plate.

5. The capacitor according to claim 4, wherein the length of the bent portion in the bare portion at the side of the element bonded to the inner bottom surface of the metal casing is set shorter than the length of the bent portion in the bare portion at the other side bonded to the inner surface of the terminal plate.

6. The capacitor according to claim 4, wherein the element comprises an electric double layer capacitor.

* * * * *